United States Patent [19]

Emmons et al.

[11] Patent Number: 4,460,625
[45] Date of Patent: * Jul. 17, 1984

[54] METHOD OF COATING AND IMPREGNATING CONCRETE SUBSTRATES, AND PRODUCTS OBTAINED THEREBY

[75] Inventors: William D. Emmons, Huntingdon Valley; Joseph A. Lavelle, Coopersburg, both of Pa.

[73] Assignee: Rohm and Haas Company, Philadelphia, Pa.

[*] Notice: The portion of the term of this patent subsequent to Aug. 23, 2000 has been disclaimed.

[21] Appl. No.: 452,165

[22] Filed: Dec. 22, 1982

Related U.S. Application Data

[63] Continuation-in-part of Ser. No. 283,091, Jul. 16, 1981, Pat. No. 4,400,413, which is a continuation-in-part of Ser. No. 182,560, Aug. 29, 1980, abandoned.

[51] Int. Cl.$^3$ ............................ C08J 3/20; C08K 3/36
[52] U.S. Cl. .................................... 427/136; 427/140; 427/427.1; 428/63; 523/218; 524/554; 526/230; 526/282
[58] Field of Search .................. 523/218; 524/554; 526/230, 282; 427/136, 140, 407.1; 428/63

[56] References Cited

U.S. PATENT DOCUMENTS

| | | | |
|---|---|---|---|
| 2,414,089 | 1/1947 | Bruson | 260/410 |
| 2,795,564 | 6/1957 | Conn et al. | 524/762 |
| 3,085,907 | 4/1963 | Zdanowski et al. | 524/375 |
| 3,150,032 | 9/1964 | Rubenstein | 428/313.7 |
| 3,575,785 | 4/1971 | McManimie et al. | 428/331 |
| 3,627,659 | 12/1971 | Marx et al. | 427/44 |
| 3,642,750 | 2/1972 | Wegemund et al. | 525/290 |
| 3,650,669 | 3/1972 | Osborn et al. | 427/37 |
| 3,703,596 | 11/1972 | Marx et al. | 524/548 |
| 4,037,038 | 7/1977 | Tsuchiya | 526/273 |
| 4,048,259 | 9/1977 | Wegemund et al. | 526/230 |
| 4,097,677 | 6/1978 | Emmons et al. | 560/220 |
| 4,131,580 | 12/1978 | Emmons et al. | 524/241 |
| 4,141,868 | 2/1979 | Emmons et al. | 524/532 |
| 4,145,503 | 3/1979 | Emmons et al. | 526/286 |
| 4,197,225 | 4/1980 | Emmons et al. | 524/650 |
| 4,234,711 | 11/1980 | Emmons et al. | 526/282 |
| 4,299,761 | 11/1981 | Emmons et al. | 428/63 |

OTHER PUBLICATIONS

Chem Abst. 75-7530e-1971 "Stoving Varnishes".
Chem Abst. 75-153046t-1971 "Anticorrosives" Marx et al.
J.A.C.S. vol. 68 (#6) 1946 Bartlett et al.
Berry et al. "Rubber World" vol. 70 (#3) pp. 42-47 (1974).

*Primary Examiner*—Herbert J. Lilling
*Attorney, Agent, or Firm*—Alex R. Sluzas

[57] ABSTRACT

This invention concerns coating and impregnating compositions for concrete of an essentially anhydrous character comprising (1) a monomer blend of (a) dicyclopentenyl or dicyclopentenyloxyalkyl methacrylate or acrylate and (b) hydroxy alkyl methacrylate and (2) a polymerization catalyst of (a) an organic peroxide and an aromatic amine accelerator, or (b) a polyvalent metal salt or complex and an organic hydroperoxide, or (c) mixtures of (a) and 0.0005% to 2% by weight, based on total amount of monomers, of a polyvalent metal salt or complex, or (d) mixtures of (a) and (b), which can be applied to porous surfaces such as concrete as an impregnant and which can be polymerized in situ in order to reduce the permeability of the surface and to provide hard, continuous, hydrophobic, wear resistant and weather resistant surfaces.

12 Claims, No Drawings

METHOD OF COATING AND IMPREGNATING CONCRETE SUBSTRATES, AND PRODUCTS OBTAINED THEREBY

BACKGROUND OF THE INVENTION

Related Application

This application is a continuation-in-part of U.S. Ser. No. 283,091, filed July 16, 1981 U.S. Pat. No. 4,400,413 which is a continuation-in-part of U.S. Ser. No. 182,560, filed Aug. 29, 1980 now abandoned.

FIELD OF THE INVENTION

This invention concerns compositions useful for coating and/or impregnating porous substrates such as concrete. The compositions of the invention may be used to impregnate already formed articles of a porous nature. For example, concrete, wood, pressboard and pressed powdered metal such as iron, aluminum, steel, etc. The composition is polymerized in situ and reduces the permeability of coated or impregnated surfaces and provides hard, continuous, hydrophobic, wear resistant and weather resistant surfaces. For the sake of brevity, the polymer impregnating compositions of this invention are somtimes hereinafter referred to as "PI".

PRIOR ART AND RELATED APPLICATIONS

McManimie, et al., U.S. Pat. No. 3,575,785 issued Apr. 20, 1971, disclose a process for covering an architectural surface by applying thereto a preformed resinous covering composition comprising (1) an inorganic filler pretreated with an organosilane coupling agent and (2) a polyalkyl methacrylate.

Zdanowski, et al., U.S. Pat. No. 3,805,907 issued Apr. 16, 1967, disclose a process for preparing a coated cement product comprising applying to a formed but uncured, heated asbestos-cement composition a coating of an aqueous dispersion containing a linear copolymer of a predominant amount of methyl methacrylate with a minor amount of a comonomer and an organic solvent (fugitive plasticizer) and heating the coated composite to remove the plasticizer and to cure the coated cement composite.

Bruson, U.S. Pat. No. 2,414,089 issued Jan. 14, 1947, discloses the preparation of esters of hydroxydicyclopentadiene with unsaturated monocarboxylic acids such as acrylic acid and methacrylic acid. The resulting esters are disclosed to be useful as vehicles for paints, varnishes and similar coating materials. Also, at column 4, lines 53–55, the patent discloses that the esters are useful as impregnates for sand cores in molding.

Emmons, Nyi and Sperry, U.S. Pat. No. 4,197,225 issued Apr. 8, 1980, which is a continuation-in-part of U.S. Ser. No. 687,856 filed May 19, 1976 and now-abandoned, and copending U.S. Pat. No. 4,263,372, issued Apr. 21, 1981, which is also a continuation-in-part of Ser. No. 687,856, in the hands of a common assignee, which assignee is the same assignee to which the present application is assigned, disclose both the production of a polymer concrete using dicyclopentenyl acrylate or methacrylate as a binder for an aggregate material, such as sand and crushed stone and a polymer impregnant based on the same binder. These two monomers used separately or as a mixture thereof, have been generically referred to by the designation DCP(M)A, the individual monomers being specifically designated DCPA and DCPMA, respectively, in the applications and patent identified above.

While the DCP(M)A mentioned has been found quite useful in the application, that is, utility mentioned, nevertheless, DCP(M)A, in spite of low volatility, has an odor that is quite characteristic, pervasive, persistent, and objectionable. The odor is a serious disadvantage especially when DCP(M)A compositions are applied indoors for laying or patching or as in impregnant for industrial floors or even when it is applied outdoors for laying or patching patios, roads, bridge decks and the like. Furthermore, the use of DCP(M)A as disclosed in these U.S. Patents tends to produce an extremely hard covering which may require considerable plasticizer to prevent fracture when the product is subjected to severe impact in use, a not unusual occurrence in the case of industrial floors and roads.

Polymer concrete compositions are composite materials formed by polymerizing one or more monomers in the presence of an inert inorganic particulate or granular material. The polymerized monomers serve as the binder for the product polymer concrete. For brevity, the expression "polymer concrete" is sometimes referred to hereinafter by the expression "PC".

Emmons and Nyi, U.S. Pat. No. 4,097,677 issued June 27, 1978, broadly disclose polymer concrete compositions wherein dicyclopentenyloxyalkyl methacrylate and acrylate are disclosed as the binder component for the inorganic powdered or granular material. See columns 25–26.

Emmons and Nyi, U.S. Pat. No. 4,145,503 issued Mar. 20, 1979, disclose, as autoxidizable compositions, soluble linear addition polymers of dicyclopentenyloxyalkyl methacrylate or acrylate, and coating and/or impregnating compositions of dicyclopentenyloxyalkyl methacrylate or acrylate, a drying oil or a film-forming addition or condensation polymer, a polyvalent metal salt or complex catalyst and, optionally, a volatile oxime stabilizer.

Emmons and Nyi, U.S. Pat. No. 4,299,761, issued Nov. 10, 1981, assigned to the same assignee to which the present application is assigned, disclose a polymer concrete composition comprising an essentially anhydrous slurry of (a) an inert inorganic particulate aggregate in (b) dicyclopentenyloxyethyl acrylate or dicyclopentenyloxyethyl methacrylate or mixture thereof, the slurry containing dissolved therein a curing catalyst consisting essentially of (c) an organic peroxide or hydroperoxide and/or (d) a polyvalent metal salt drier.

Compared to DCP(M)A, the dicyclopentenyloxyethyl acrylate and methacrylate are liquid reactive monomers having substantially lower volatility and a substantially higher flash point and practically no odor so that PC compositions containing them can be spread out, as by trowelling, to form, patch or impregnate a floor indoors or to form, patch, or impregnate a concrete pavement on a road or highway even in hot weather, without developing abnoxious odor at the work site.

While dicyclopentenyloxyethyl methacrylate and acrylate have thus been found useful, and advantageous over the previous use of methyl methacrylate and DCP(M)A, in polymer concrete compositions, there remains a need for further improvement in the chemical resistance of polymer concrete produced using dicyclopentenyloxyethyl methacrylate as the binder relative to PC products, coatings, and impregnant made using epoxy resins as the binder. Also, the relatively high cost of the use of dicyclopentenyloxyethyl methacrylate when compared with the lower cost of epoxy resins is a disadvantage for the use of the former monomer as the binder in PC.

DESCRIPTION OF THE INVENTION

It is an object of this invention to provide polymer impregnant and coating compositions which, when applied to porous surfaces such as concrete, wood, pressboard, cinder block and pressed powdered metal and the like, will exhibit sufficient open time (i.e. time prior to cure, induction speed) to allow an unhurried and workman-like application of the composition, and which also cure both in bulk and at the surface within a relatively short period after application. Another object of this invention is to provide impregnant compositions which will exhibit sufficient open time to allow workman-like application but will cure in bulk within a relatively short period after application. Another object of this invention is to provide an essentially anhydrous polymer coating and/or impregnant (PI) using an acrylic monomer mixture and catalyst system which affords improved chemical resistance and reduced cost. The expression "essentially anhydrous" is not meant to exclude minor amounts of water, e.g., up to 1% moisture in the inorganic particulate or granular aggregate material.

The present invention comprises an acrylic composition comprising an essentially anhydrous slurry of (1) a monomer mixture consisting essentially of
(a) from about 25% to 75% by weight, based on total of monomers, of at least one compound selected from isodecyl methacrylate, cetyl stearyl methacrylate, lauryl methacrylate, dodecyl pentadecyl methacrylate, cetyl eicosyl methacrylate, stearyl methacrylate, and the dicyclopentenyl- or dicyclopentenyloxyalkyl ester of polymerizable $\alpha,\beta$-unsaturated monocarboxylic acid selected from the methacrylic acid or acrylic acid esters, the dicyclopentenyloxyalkyl ester being represented by the formula

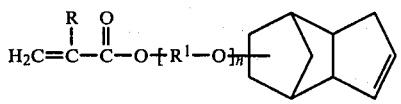

wherein R is $CH_3$ or H, n is 0 or 1, and $R^1$ is selected from (i) alkylene groups having 2 to 6 carbon atoms and (ii) oxyalkylene groups having 4 to 6 carbon atoms and having one or more oxygen atoms joining distinct segments of the alkylene chain, each segment having at least 2 carbon atoms, and (b) from about 75% to 25% by weight, based on total of monomers, of at least one hydroxyalkyl methacrylate represented by the formula

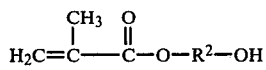

(II)

wherein $R^2$ is a straight or branched chain $(C_1-C_6)$ alkyl group or a $(C_3-C_6)$ cycloalkyl group, the total of monomers being 100%; and (2) a polymerization catalyst selected from
(a) about 0.1% to 3% by weight, based on total of monomers, of a $(C_3-C_{18})$ hydrocarbyl peroxide with about 0.1% to 5% by weight, based on total of monomers, of an aromatic amine polymerization accelerator,
(b) about 0.1% to 3% by weight, based on total of monomers, of a $(C_3-C_{18})$ hydrocarbyl hydroperoxide with about 0.0005% to 2% by weight, based on total of monomers, of a polyvalent metal salt or complex,
(c) mixtures of (a) and 0.0005% to 2% by weight, based on total amount of monomers, of a polyvalent metal salt or complex, and
(d) mixtures of (a) and (b).

This invention contemplates the impregnation of already formed articles having a porous surface with the blend of hydroxyalkyl (meth)acrylate with at least one compound selected from isodecyl methacrylate, cetyl stearyl methacrylate, dodecyl pentadecyl methacrylate, cetyl eicosyl methacrylate, stearyl methacrylate, and dicyclopentenyl or dicyclopentenoxyethyl acrylate or methacrylate with catalysts to penetrate at least the outer pores of the surface of such porous articles to harden the surface and to make it resistant to penetration by such liquids as water, organic solvent materials, acids, alkalides and other corrosive liquids. Examples of porous-surface materials include concrete, stone masonry or brick walls including the facings of the mortar between the bricks and the stones, weathered archeaological artifacts and wall structures, weathered granite and marble walks and sculptures previously formed and hardened, walls, floors, and ceilings whether formed of plaster, concrete, cement, wood, pressboards, pressed metals such as those formed of iron, aluminium, and steel, and the like. Impregnation of the surfaces of such articles with the monomer blend and catalyst system results in the impartation of a hardened, relatively impermeable surface adapted to resist indentation by impact as well as penetration by means of moisture and other liquids such as those mentioned above. Such impregnation results in rendering the objects resistant to the corrosive and degradative effects caused by weathering and to atmospheric smog (resulting from discharge into the atmosphere of industrial and internal combustion waste gases, e.g. the oxides of sulphur, nitrogen, and carbon from internal combustion engines in automobiles, buses, etc.).

The dicyclopentenyloxyalkyl methacrylate and acrylate esters used in the invention as one of the two required components in the binder monomer system, defined by formula I above, are known compounds, These ester-ether compounds and methods for their preparation are disclosed in U.S. Pat. No. 4,097,677 mentioned above. Preferably, this component of the binder monomer system comprises at least one member selected from the group consisting of dicyclopentenyloxyethyl methacrylate, discyclopentenyloxyisopropyl methacrylate, dicyclopentenyloxyisopropyl acrylate, and dicyclopentenyloxyneopentyl methacrylate. Dicyclopentenyloxyethyl methacrylate is most preferred.

The dicyclopentenyl alkyl methacrylate and acrylate esters used in the invention, defined by formula I above, are also known compounds. These monomers are prepared by hydrolyzing dicyclopentendiene to dicyclopentenylalkyl, and subsequently either esterifying with methacrylate or acrylate acid or by transesterification with an alkyl methacrylate or acrylate. Both the processes of esterification and transesterification are well known in the art.

The hydroxyalkyl methacrylate esters used in the invention as the other of the two required components in the binder monomer system, defined by formula II above, are well-known compounds. Preferably, this component comprises at least one of hydroxyethyl methacrylate (HEMA) and hydroxypropyl methacrylate (HPMA).

The relative amounts of the hydroxyalkyl methacrylate component and the other component, or, in the case of a mixture of more than two components, the remaining components, of the binder monomer system can vary from about 25% to 75% by weight, respectively, based on the total of monomers, the total being 100%. A one-to-one blend is preferred.

By the expression "non-volatile" as applied to the binder monomer system of the PI according to the invention, it is intended that the monomers or mixtures thereof must have a vapor pressure/reactivity balance under the conditions of ambient temperature cure such that no more than about 5% by weight of binder monomers is lost by evaporation prior to complete cure or polymerization.

The liquid impregnating composition of the present invention may contain minor amounts of additives such as coloring agents, texturing agents, inhibitors, stabilizers, antioxidants, thickeners, rheology modifiers, preservatives (e.g. for wood and other materials subject to biological or environmental degradation) and the like. Depending on the pore size of the substrate, the composition may also contain minor amounts of fillers, sand and/or small aggregate, subject to the limitation that the average particle size of such materials be substantially less than the size of the largest pores of the substrate.

The aggregate material optionally used herein may be any inert inorganic substance that is resistant to such organic and inorganic acids, salts, and alkalis as may be encountered in common industrial plants, e.g., hydrochloric acid, sulfuric acid, nitric acid, sulfonic acid, phosphoric acid, acetic acid, formic acid; sodium, potassium, calcium, and magnesium salts, e.g., the chlorides, sulfates and alkali metal and alkaline earth metal hydroxides. Examples of suitable aggregates include sand, silica flour, crushed rocks or stones of quartz, granite, feldspar, gneiss, basalt, porphyry, and small pebbles thereof. The sand that may be used may be of any quality or of any size in the range specified above. Graded sand of medium particle size such as "Ottawa" sand and "Best" sand or a mixture of the two may be used to better advantage. Ottawa sand is a silica sand of the type referred to as "round". Best sand is of the type known as "sharp". In both cases, fines will have been removed. In general, however, the sieve size of the sand may vary over a fairly wide range. In lieu of or in addition to sand, it is possible to use fractured colored glass marbles, ground glass, silica flour, emergy powder, ground slag, and fine gravel.

The composition may be colored by the choice of a colored aggregate or by including within the composition a suitable amount of pigment or dye dissolved in the binder monomer system. The amount of such pigment or dye may vary from about 1% to 10% by weight of the composition.

The addition of the polymerization catalyst, for example, a polyvalent metal salt or complex and organic hydroperoxide can be made to the monomer mixture prior to application. The proportion of metal salt or complex added to the composition before application may be from 0.0005 weight percent up to about 2 weight percent, and the amount of hydroperoxide may be in the range of 0.1 to 3 weight percent, based on the total weight of the monomers. Similarly, the addition of an organic peroxide, with an aromatic amine accelerator, and optionally with a polyvalent metal salt or complex, can be made to the mixture prior to application. The proportion of the organic peroxide to the composition may be in the range of 0.1 to 3 weight percent and the aromatic amine accelerator is used in an effective amount, usually in the range of about 0.1 to 5 weight percent.

The polymerization catalyst components, such as polyvalent metal salt or complex and hydroperoxide, or the aromatic amine accelerator and peroxide, may be packed and shipped separately to the site of operations where the respective components may be combined and where the composition of the present invention is to be applied, as by pouring or spraying to impregnate or seal a concrete floor or base or pavement. Alternatively, the aromatic amine accelerator and binder monomer system, and the organic peroxide respectively, may be combined in packages for storing and shipping prior to combining them to provide the composition of the invention shortly before applying the composition.

The polyvalent metal salt or complex used in the invention may be any polyvalent metal-containing salt that catalyzes the oxidative curing of drying oils and, when added to oil-based varnishes and paints, hastens the drying or curing thereof. These metal salts or complexes are also known, in the art, as "siccatives" or "driers". Such substances include the polyvalent metal salts of higher aliphatic acids, such as the butyrate, pentanoate, hexanoate, and especially the salts of higher aliphatic acids having from 8 to 30 carbon atoms or of naphthenic acids that provide solubility in the binder monomer system. Generally, the most useful drier salts for the binder monomer system compositions of the present invention are salts of naphthenic acids or of ($C_8$ to $C_{30}$) aliphatic acids. Examples of the polyvalent metal include calcium, copper$^{II}$, zinc$^{II}$, manganese$^{II}$, manganese$^{III}$, lead$^{II}$, cobalt$^{II}$, iron$^{III}$, vanadium$^{II}$, and zirconium$^{IV}$. These salts or complexes accelerate the action of the organic hydroperoxide and promote oxidative curing in the organic peroxide-amine catalyst system. Other examples of the acid component or anion of the drier salt are those of resinic acids, (that is, rosin acids), tall oil fatty acids, linseed oil fatty acids, 2-ethylhexanoic acid, lauric acid, palmitic acid, myristic acid, stearic acid, oleic acid, linoleic acid, behenic acid, cerotic acid, monotanic acid, and abietic acid. The mixture of drier salts may be used.

Preferred drier salts are those of cobalt and manganese, such as cobalt octoate, cobalt naphthenate, cobalt acetylacetonate and manganese octoate, manganese naphthenate, and manganese acetylacetonate.

Aromatic amines may be used in small amounts with the organic peroxides and generally accelerate the action of the peroxide. For example, aniline, N,N-dimethylaniline, N,N-diethylaniline, toluidine, N,N-dimethyl p-toluidine, N,N-di(hydroxyethyl)toluidine, and p-dimethylaminobenzaldehyde may be added for this purpose in an amount of 0.1 to 2 percent by weight of the binder monomer system.

The organic peroxides and hydroperoxides that may be used include the peroxides and the hydroperoxides derived from hydrocarbons which contain from about 3 to 18 carbon atoms so that they are soluble in the binder monomer system. Suitable organic hydroperoxides include tertiary-butylhydroperoxide, cumene hydroperoxide, methyl ethyl ketone hydroperoxide and diisopropylbenzene hydroperoxide. Suitable peroxides include benzoyl peroxide, tert-butylperbenzoate, 2,2-bis-(tert-butylperoxy)-butane, bis-(1-hydroxy-cyclohexyl)-butane, bis-(1-hydroxy-cyclohexyl)-peroxide, and tert-butylperoxy-isopropyl carbonate.

A preferable polymerization catalyst is a mixture of an organic peroxide and an aromatic amine. A more preferable polymerization catalyst is a mixture of benzoyl peroxide and N,N-dimethyl p-toluidine. An especially preferred polymerization catalyst is a mixture of p-dimethylaminobenzaldehyde, benzoyl peroxide and cobalt carboxylate.

The impregnation may be accomplished at ambient temperature. In any event, the composition with which the present invention is concerned may be completely free of volatile substances so that shrinkage that is difficult to control when other compositions having volatile components are used is avoided.

The PI composition may be utilized for coating substrates such as metal, glass and plastics by conventional application techniques in order to provide surfaces having advantageous chemical resistance.

The use of both organic peroxide and aromatic amine accelerator or organic hydroperoxide and polyvalent metal salt drier serves to ensure the curing of the PI to a solid state in a relatively short time, such as from 5 to 30 minutes. However, curing of the surface may require additional drying time such as up to 24 hours or so to overcome tackiness because of the inhibition of polymerization of the binder monomers by free radical action occurring at the air/surface interface. This initial tackiness may be overcome more rapidly by coating of the exposed surface(s) shortly after initial hardening of the composition with a free radical initiator contained in a suitable immiscible liquid that will exclude air from the surface after application thereof thereto.

The compositions described hereinabove are generally hard and tough when cured. When it is desired to render such compositions more flexible, a small proportion of a drying oil, such linseed oil, or of an acrylic polymer having a low second order transition temperature ($T_g$), such as poly(ethylacrylate), poly(butylacrylate), or poly(2-ethylhexylacrylate), or a mixture of a drying oil and low $T_g$ acrylic polymer, may be added to the composition and may replace part of the binder monomer system. Alternatively, the required binder monomers may be used with a small proportion of an auxiliary liquid monomeric acrylic and/or vinyl ester binder forming material which is of low volatility and can reduce the hardness and impart a more flexible or resilient character to the final composition. A mixture of a drying oil and an auxiliary monomer may also be used. Such other acrylic ester monomers include ($C_{12}$–$C_{30}$) alkyl, or ($C_{12}$–$C_{30}$) alkenyl, acrylates such as lauryl acrylate, myristyl acrylate, palmityl acrylate, oleyl acrylate, linoleyl acrylate, linolenyl acrylate, stearyl acrylate; similar improvements in flexibility may be obtained by including with the required binder monomers long chain ($C_{12}$–$C_{30}$) aliphatic acid vinyl esters, e.g., vinyl laurate, vinyl oleate, vinyl stearate or di($C_4$–$C_8$)alkyl esters of maleic acid, fumaric acid, or itaconic acid, e.g., the dibutyl, dihexyl, or dioctyl fumarate, maleate, or itaconate. The required binder monomers may also be used with small proportions of multifunctional, i.e., polyethylenically unsaturated monomers such as polyol (meth)acrylates and polyalkylene polyol (meth)acrylates, such as ethylene glycol diacrylate or dimethacrylate, trimethylolpropane triacrylate or trimethacrylate, triethylene glycol (meth)acrylate, etc. All of these monomeric materials have low volatility and are polymerizable by the action of the peroxide and the metal salt drier to form products having greater toughness and resistance to water, organic solvents, acids, and alkali. The proportion of these auxiliary monomers, if used, may be from about ½ percent to 25% by weight of the binder monomer system component of the composition, but preferably is not over about 20% by weight of such component.

The PI of the present invention is especially useful for impregnating industrial flooring, basement flooring, pavement, roads, bridges, and ship decks or floors. In all such structures, the cured product is resistant to water, organic solvents, such as gasoline, and highly corrosive media such as acids, salts, and alkalis.

In the following examples illustrating but a few embodiments of the invention, the parts and percentages are by weight and the temperatures are in Celsius or Centigrade degrees unless otherwise stated.

The following abbreviations are used to designate the corresponding compounds:

DCPMA = dicyclopentenyl methacrylate
DCPOiPMA = dicyclopentenyloxyisopropyl methacrylate
DCPOiPA = dicyclopentenyloxyisopropyl acrylate
DCPONMA = dicyclopentenyloxyneopentyl methacrylate
HEMA = hydroxyethyl methacrylate
HPMA = hydroxypropyl methacrylate

Flash Point Test Method

The Flash Point Set A Flash Closed Cup Method ASTM D-32-78 is employed to evaluate the flash point of the monomer mixture of the invention.

Test Method for Water/Solvent Absorption

1"×1"×2" blocks of concrete are cast using a 3/1 Pettinos #45 sand/cement (Type I) ratio with a water/cemet ratio of 0.60. These are allowed to cure at room temperature 24 hours then immersed in water for 7 days to cure. Before use they are subjected to a 24 hour drying at 70° C. The blocks are removed from the oven and allowed to equilibrate at room temperature for 24 hours.

The blocks are totally immersed in the catalyzed monomer for 20 minutes. The samples are then removed and excess monomer wiped off; the blocks are then allowed to cure 24 hours at room temperature. The "impregnated" blocks are dipped into the water, removed immediately, excess water wiped off and then weighed. The samples are then reimmersed in water or test liquid and removed at various predetermined time intervals, excess liquid is wiped off and samples weighed. The weight pickup is then calculated and reported as the percent of absorption. All samples are tested in duplicate.

Abrasion Resistance Test Method

The substrate used is prepared from a 3/1 blend of Pettinos #45 sand/Type I Portland cement employing 0.60% water on the weight of cement. This mortar is poured into a mold with a thickness of ¾ inch, a diameter of 4½ inches, a circumference of 14.1 inches, and a surface area of 15.9 inches$^2$. The substrate is allowed to cure 24 hours at room temperature, then immersed in water for 7 days, removed and dried 24 hours at 70° C.

The substrate is then coated with the catalyzed monomers at an application rate of 100 sq. ft./gal. The impregnated test samples are allowed to cure at 23° C./50% relative humidity for one day.

After curing the test samples are weighed. The samples are then abraded on a Tabor Abraser using Calibrade H-22 grit wheels with 500 grams weight on each wheel. The weight loss in grams is recorded after 100, 500 and 1000 cycles. The samples are tested in duplicate.

It is to be understood that commercial grade hydroxyethyl methacrylate and hydroxypropyl methacrylate monomers are used and that, as is known in the art, such commercial grade monomers generally contain about 90% and 92%, respectively, of the desired ester product, the balance to 100% being high boiling methacrylate compounds, methacrylate acid, dimethacrylate compounds and the corresponding alkylene oxide.

EXAMPLE A

Effect of HEMA and HPMA on Flash Point of DCPOEMA

2-Hydroxyethyl methacrylate (HEMA) and hydroxy propyl methacrylates (HPMA) are physically blended at varying weight ratios with DCPOEMA. The flash point of the respective blends is measured by standard Setaflash closed cup test method. The results are summarized in Table I below.

TABLE I

Setaflash Closed Cup Flash Points of DCPOEMA/
Hydroxyalkyl Methacrylate Monomer Blends

| % Hydroxyalkyl Methacrylate | Setaflash Point (°F.) | | | | |
|---|---|---|---|---|---|
| | 0[a] | 25 | 50 | 75 | 100 |
| HEMA | >230 | >230 | 224 | 218 | 210 |
| HPMA | >230 | >230 | 220 | 208 | 204 |

[a]100% DCPOEMA

The results shown in Table I demonstrate that the use of HPMA or HEMA lowers the flash point of DCPOEMA. Even at levels of hydroxyalkyl methacrylate >50% the flash point is still >200° F. which represents a range in which even bulk shipments would be regulated by Department of Transportation combustible codes and would not require red labeling.

EXAMPLE B

Evaluation of The Cure Rate of a PI Composition Based on DCPOEMA/HPMA Cured with Variou Catalyst Systems Hydroxypropyl methacrylate (HPMA), typical of the hydroxyalkyl methacrylate esters employed as comonomers in the binder monomer system in the PI compositions of the invention, is blended at a 1:1 weight ratio with DCPOEMA and the resulting blend is mixed with various catalyst systems as given in Table II. The development of viscosity and cure properties of the various catalyzed systems are also given in Table II. The data of Table II indicate that the impregnant compositions of this invention exhibit good cure characteristics. The compositions of the invention are useful as impregnants having an open time or induction period adequate to allow application of the composition and also display rapid development of both bulk and surface cure of the composition.

EXAMPLE C

Performance Properties of HPMA/DCPMA and DCPOEMA Systems

In Table III, composition, immersion weight gain and abrasion resistance data are presented for DCPMA/HPMA and DCPOEMA/HPMA impregnant compositions and are compared with results obtained for the constituent monomers as well as for other concrete surface treatments and untreated concrete itself. Immersion weight gain and abrasion resistance test methods are given above. Comparison of Examples 2 and 3 with Comparative Examples 5 and 6 indicate that applicants' impregnants display superior abrasion resistance over untreated silane treated concrete. A further comparison of the solvent resistance, as measured by the immersion weight gain test, of Example 3 containing applicants' preferred dimethylamino benzaldehyde accelerator with Comparative Examples 5, 6 and 7 indicates that the Example 3 composition exhibits a better balance of solvent resistance properties than the silane-based surface treatment of Comparative Example 5 and significantly better solvent resistance for each solvent tested than either untreated or linseed oil-treated concrete. Linseed oil treatment of concrete has the additional disadvantages of being subject to saponification of alkaline concrete and of tending to render the concrete surface slippery.

TABLE II

Polymer Impregnant Compositions

| | Formulation | | | | |
|---|---|---|---|---|---|
| Monomer Mix | A | B | C | D | E |
| | HPMA/DCPOEMA// | | | 1/1 | |
| Catalyst system[1] | 0 | 2 | 2 | 2 | 2 |
| dimethylamino-benzaldehyde[2] | | | | | |
| cumene hydroperoxide | 4 | 4 | 4 | 4 | 0 |
| benzoyl peroxide[5] | 0 | 0 | 0 | 0 | 4.0 |
| cobalt napthenate[3] | 0.128 | 0.128 | 0.128 | 0 | 0 |
| cobalt carboxylate[4] | 0 | 0 | 0 | 1.14 | 1.14 |
| MEHQ | 0 | 0 | 0 | 0 | (250 ppm) |
| Viscosity (cps) | | | | | |
| Initial | 10 | 20 | 15 | 15 | 10 |
| 20 min. | 10 | 20 | 15 | 15 | 10 |
| 25 min. | — | 30 | 20 | 20 | 10 |
| 30 | 10 | — | 60 | 30 | — |
| 35 | — | — | 400 | 190 | 15 |
| 40 | 15 | 174 | 2000 | 2000 | — |
| 45 | — | 2000 | — | — | 20 |
| 50 | 20 | — | — | — | 30 |
| 60 | 50 | — | — | — | 80 |
| 70 | 85 | — | — | — | 2000 |
| Time required | | | | | |
| for bulk cure | 90 min | 40 min | 45 min | — | — |
| for surface cure (bulk free time) | >8 hrs | <24 hrs | 6 hrs | 7 hrs | — |

[1]% on weight of monomer
[2]% solid p-dimethylamino benzaldehyde on weight of monomer
[3]6% cobalt
[4]Catalyst 414z, Mooney Chemical, 11.2% cobalt
[5]Cadox BFF-50, Noury Chemical, 50% active benzoyl peroxide in plasticizer

TABLE III

Performance Properties of Impregnant Compositions

| | Examples | | | Comparative Examples | | |
|---|---|---|---|---|---|---|
| | 1 | 2 | 3 | 1 | 2 | 3 |
| MONOMER(s) | DCPMA/HPMA | DCPOEMA/HPMA | DCPOEMA/HPMA | DCPOEMA | DCPOEMA | HPMA |
| % Composition | 50/50 | 50/50 | 50/50 | 100 | 100 | 100 |
| Inhibitor HQ (ppm) | 25 | 25 | 25 | 50 | 50 | — |
| MEHQ (ppm) | 125 | 125 | 125 | — | — | 250 |
| Phenothiozine (ppm) | | 200 | 200 | — | — | — |
| Catalyst System | | | | | | |
| DMAB (%) | 0 | 0 | 2 | 0 | 2 | 0 |
| Cumene Hydroperoxide | | | 2.92 Active on Monomer | | | |
| Cobalt Naphthenate (6%) | | | 0.128% Cobalt on Monomer | | | |
| | | | % Weight Gain After 24 Hours Immersion | | | |
| Water | 3.0 | 2.8 | 0.6 | 2.8 | 1.3 | 4.8 |
| 3% NaCl | — | 1.5 | 0.4 | — | — | — |
| Unleaded Gasoline | — | 3.2 | 0.9 | — | — | — |
| Aviation Fuel | — | 3.0 | 2.0 | — | — | — |
| Skydrol | — | 1.2 | 0.5 | — | — | — |
| 10% NaOH | — | 1.1 | 0.56 | — | — | — |
| 10% $H_2SO_4$ | — | 2.4 | 2.9 | — | — | — |
| | | | Abrasion Resistance (Weight loss in grams) | | | |
| 100 Cycles | — | 1.63 | 1.30 | — | — | — |
| 500 Cycles | — | 4.68 | 4.05 | — | — | — |
| 1000 Cycles | — | 8.70 | 7.15 | — | — | — |

| | Comparative Examples | | | |
|---|---|---|---|---|
| | 4 | 5 | 6 | 7 |
| MONOMER(s) | DCPMA | CHEMTRETE[1] | LINSEED OIL | NONE |
| % Composition | 100 | — | 100 | — |
| Inhibitor HQ (ppm) | 50 | — | — | — |
| MEHQ (ppm) | — | — | — | — |
| Phenothiozine (ppm) | — | — | — | — |
| Catalyst System | | | | |
| DMAB (%) | 0 | — | — | — |
| Cumene Hydroperoxide | — | — | — | — |
| Cobalt Naphthenate (6%) | — | — | — | — |
| | | % Weight Gain After 24 Hours Immersion | | |
| Water | 2.8 | 0.4 | 2.5 | 6.0 |
| 3% NaCl | — | 0.2 | 2.5 | 5.4 |
| Unleaded Gasoline | — | 4.1 | 3.1 | 4.3 |
| Aviation Fuel | — | 4.6 | 3.4 | 4.8 |
| Skydrol | — | 4.9 | 3.8 | 4.7 |
| 10% NaOH | — | 0.7 | 3.7 | 6.0 |
| 10% $H_2SO_4$ | — | −(0.3) | −(3.9) | −(0.9) |
| | | Abrasion Resistance (Weight loss in grams) | | |
| 100 Cycles | — | 3.70 | — | 2.73 |
| 500 Cycles | — | 8.70 | — | 7.18 |
| 1000 Cycles | — | 14.60 | — | 11.98 |

[1]Chemtrete is a trademark of Dynamit Nobel for isobutyl trimethoxy silane in an ethanol carrier.

What is claimed is:

1. An acrylic polymer impregnant composition comprising an essentially anhydrous slurry of
    (1) a non-volatile binder monomer system comprising
        (a) from about 25% to 75% by weight, based on total of monomers, of at least one compound selected from isodecyl methacrylate, cetyl stearyl methacrylate, lauryl methacrylate, dodecyl pentadecyl methacrylate, cetyl eicosyl methacrylate, stearyl methacrylate and the dicyclopentenyloxyalkyl or dicyclopentenyl ester of a polymerizable α,β-unsaturated monocarboxylic acid selected from methacrylic acid or acrylic acid, the ester being represented by the formula

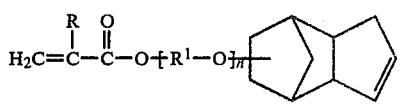

wherein
R is $CH_3$ or H,
n is 0 or 1 and
$R^1$ is selected from
   (i) alkylene groups having 2 to 6 carbon atoms and
   (ii) oxyalkylene groups having 4 to 6 carbon atoms and having one or more oxygen atoms joining distinct segments of the alkylene chain, each segment having at least 2 carbon atoms, and (b) from about 75% to 25% by weight, based on total of monomers, of at least one hydroxyalkyl methacrylate represented by the formula

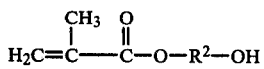

wherein $R^2$ is a straight or branched chain ($C_{10}$–$C_6$) alkyl group or a ($C_3$–$C_6$) cycloalkyl group, the total of monomers being 100%; and (2) a polymerization catalyst selected from
(a) about 0.1% to 3% by weight, based on total of monomers, of a ($C_3$–$C_{18}$) hydrocarbyl peroxide with about 0.1% to 5% by weight, based on total of monomers, of an aromatic amine polymerization accelerator, or
(b) about 0.1% to 3% by weight, based on total of monomers, of a ($C_3$–$C_{18}$) hydrocarbyl hydroperoxide with about 0.0005% to 2% by weight, based on total of monomers, of a polyvalent metal salt or complex,
(c) mixtures of (a) and 0.005% to 2% by weight, based on total amount of monomers, of a polyvalent metal salt or complex, or
(d) mixtures of (a) and (b).

2. A composition according to claim 1 wherein the ester monomer is selected from dicyclopentenyloxyethyl methacrylate, dicyclopentenyloxyisopropyl methacrylate, dicyclopentenyloxyisopropyl acrylate, and dicyclopentenyloxyneopentenyl methacrylate.

3. A composition according to claim 1 wherein the ester monomer is dicyclopentenyloxyethyl methacrylate.

4. A composition according to claim 1 wherein the hydroxylalkyl methacrylate is selected from hydroxyethyl methacrylate and hydroxypropyl methacrylate.

5. A composition according to claim 1 wherein
(1) the non-volatile binder monomer system comprises from about 12% to 20% by weight of total solids of
(a) from about 25% to 75% by weight, based on total monomers, of at least one of dicyclopentenyloxyethyl methacrylate, dicyclopentenyloxyisopropyl methacrylate, dicyclopentenyloxyisopropyl acrylate or dicyclopentenyloxyneopentenyl methacrylate, and
(b) from about 75% to 25% by weight, based on total monomers, of at least one of hydroxyethyl methacrylate or hydroxypropyl methacrylate; and
(2) the polymerization catalyst is selected from
(a) ($C_3$–$C_{18}$) hydrocarbyl peroxide with an aromatic amine selected from aniline, N,N-dimethylaniline, N,N-diethylaniline, toluidine, N,N-dimethyl p-toluidine, N,N-di(hydroxyethyl) toluidine, or N,N-dimethylaminobenzaldehyde, or
(b) a ($C_3$–$C_{18}$) hydrocarbyl hydroperoxide with a polyvalent metal salt of a ($C_8$–$C_{30}$) aliphatic acid or of naphthenic acid.

6. A composition according to claim 5 wherein
(1) the non-volatile binder monomer system comprises
(a) dicyclopentenyloxyethyl methacrylate, and
(b) at least one of hydroxyethyl methacrylate and hydroxypropyl methacrylate; and
(2) the polymerization catalyst is selected from
(a) a mixture of cumene hydroperoxide and cobalt naphthenate,
(b) a mixture of benzoyl peroxide and N,N-dimethyl p-toluidine, and
(c) a mixture of benzoyl peroxide, N,N-dimethylaminobenzaldehye and cobalt naphthenate.

7. A composition according to claim 5 wherein
(1) the non-volatile binder monomer system comprises about 15% by weight of
(a) about 50% by weight, based on total of monomers, of dicyclopentenyloxyethyl methacrylate, and
(b) about 50% by weight, based on total of monomers, of hydroxypropyl methacrylate; and
(2) the polymerization catalyst comprises cumene hydroperoxide and cobalt naphthenate.

8. A composition according to claim 5 wherein
(1) the non-volatile binder monomer system comprises about 15% by weight of
(a) about 50% by weight, based on total of monomers, of dicyclopentenyloxyethyl methacrylate, and
(b) about 50% by weight, based on total of monomers, of hydroxypropyl methacrylate; and
(2) the polymerization catalyst comprises benzoyl peroxide and N,N-dimethyl p-toluidine.

9. A method of impregnating a concrete floor, base, or pavement on a highway or bridge-deck which comprises spreading and/or spraying a mixture according to claim 1 containing components (1) and (2) on the surface areas needing repair, and letting the impregnated surface cure at ambient conditions.

10. A polymer impregnated product obtained by curing a formed mass of the composition according to claim 1 by exposing said mass to air at ambient temperature.

11. A product obtained by the process of claim 7.

12. A two-package article of commerce adapted to be stored, transported to the site of use, and to be mixed to form the polymer concrete slurry of claim 1, one of the packages the curing catalyst component (2), the other containing the liquid monomer component (1).

* * * * *